(12) United States Patent
Park et al.

(10) Patent No.: US 9,413,451 B2
(45) Date of Patent: Aug. 9, 2016

(54) METHOD AND APPARATUS FOR TRANSMITTING AND RECEIVING BROADCAST CHANNEL IN CELLULAR COMMUNICATION SYSTEM

(71) Applicant: Samsung Electronics Co., Ltd, Gyeonggi-do (KR)

(72) Inventors: Jeong-Ho Park, Seoul (KR); Hyun-Kyu Yu, Gyeonggi-do (KR); Su-Ryong Jeong, Yongin-si (KR); Jae-Weon Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 14/035,908

(22) Filed: Sep. 24, 2013

(65) Prior Publication Data

US 2014/0086217 A1    Mar. 27, 2014

(30) Foreign Application Priority Data

Sep. 24, 2012  (KR) .................. 10-2012-0105577

(51) Int. Cl.
 *H04B 7/26* (2006.01)
 *H04L 25/03* (2006.01)
 *H04B 7/04* (2006.01)
 *H04B 7/06* (2006.01)
 *H04L 1/08* (2006.01)

(52) U.S. Cl.
 CPC ............ *H04B 7/2628* (2013.01); *H04B 7/0413* (2013.01); *H04L 25/0391* (2013.01); *H04B 7/0617* (2013.01); *H04B 7/0678* (2013.01); *H04L 1/08* (2013.01)

(58) Field of Classification Search
 CPC ... H04B 7/2628; H04B 7/2643; H04B 7/0413
 USPC ......................................................... 370/335
 See application file for complete search history.

(56) References Cited

U.S. PATENT DOCUMENTS 6,147,964 A * 11/2000 Black et al. ................... 370/209
6,185,265 B1 * 2/2001 Campanella ................. 375/341
6,233,466 B1   5/2001 Wong et al.

(Continued)

FOREIGN PATENT DOCUMENTS

KR    10-2007-0108316    11/2007

OTHER PUBLICATIONS

3GPP TS 36.211 V9.1.0 (Release 9), "3rd Generation Parntership Project; Technical Specification Group Radio Access Network; Evolved Universal Terrestrial Radio Access (E-UTRA), Physical Channels and Modulation", Mar. 2010, 85 pages.

(Continued)

*Primary Examiner* — Rasheed Gidado

(57) ABSTRACT

Provided is a method and apparatus for transmitting and receiving a Broadcast Channel (BCH) in a cellular communication system. The method for transmitting a BCH in a cellular communication system includes repeating symbols comprising information about the BCH, code-covering the repeated symbols with codes selected from a previously given code set, subcarrier-mapping the code-covered symbols, and transmitting the subcarrier-mapped symbols in one frame by using different beams corresponding to the selected codes. The codes are selected based on a number of repetitions, a cell identifier, and a beam index.

36 Claims, 12 Drawing Sheets

(56) References Cited

U.S. PATENT DOCUMENTS

| | | | |
|---|---|---|---|
| 8,351,413 B2* | 1/2013 | Lee et al. | 370/344 |
| 2004/0082356 A1* | 4/2004 | Walton et al. | 455/522 |
| 2004/0132454 A1 | 7/2004 | Trott et al. | |
| 2009/0232244 A1* | 9/2009 | Kawasaki | 375/267 |
| 2009/0252109 A1* | 10/2009 | Kim et al. | 370/330 |
| 2010/0142638 A1* | 6/2010 | Jalali et al. | 375/260 |
| 2012/0307726 A1* | 12/2012 | Pi et al. | H04J 11/0069 370/328 |

OTHER PUBLICATIONS

IEEE P802.,16.1/D3, "WirelessMAN-Advanced Air Interface for Broadband Wireless Access Systems", Nov. 2011, 1072 pages.

Extended European Search Report issued for EP 13839237.8 dated Apr. 20, 2016, 10 pgs.

* cited by examiner

METHOD AND APPARATUS FOR TRANSMITTING AND RECEIVING BROADCAST CHANNEL IN CELLULAR COMMUNICATION SYSTEM

CROSS-REFERENCE TO RELATED APPLICATION(S) AND CLAIM OF PRIORITY

The present application is related to and claims priority under 35 U.S.C. §119(a) to Korean Patent Application Serial No. 10-2012-0105577, which was filed in the Korean Intellectual Property Office on Sep. 24, 2012, the entire disclosure of which is hereby incorporated by reference.

TECHNICAL FIELD

The present disclosure relates to transmission and reception of information in a communication system, and more particularly, to a method and apparatus for transmitting and receiving a Broadcast Channel (BCH) in a Beam-Forming (BF)-based cellular communication system.

BACKGROUND

Wireless communication systems have been developed to support higher data rate in order to meet the ever-increasing demand for wireless data traffic. For an increase in data rate of wireless communication systems, technology development has been carried out based on communication technologies such as Code Division Multiple Access (CDMA), Orthogonal Frequency Division Multiple Access (OFDMA) and Multiple Input Multiple Output (MIMO), mainly to improve the spectral efficiency. However, the surging demand for wireless data traffic may not be fully met only with these spectral efficiency improvement technologies.

Recently, the increasing demand for smart devices such as smart phones and tablet PCs and the explosive growth of applications that operate on the smart devices and require a lot of traffic have further accelerated the demand for wireless data traffic. One way to overcome the traffic increase is to consider the use of ultra wideband frequencies in a microwave domain. However, wireless communication in a microwave band may suffer from an increase in propagation loss such as a path loss and a return loss due to the frequency characteristics of the microwave band. As a result, the range of radio waves is reduced causing a significant decrease in coverage. On the other hand, in case of wireless communication in the microwave band, the wavelength is very short due to the frequency characteristics of the microwave band, making it easy to apply beamforming that uses a plurality of small antennas. Accordingly, it is possible to seek new ways to increase the range of radio waves and expand the coverage by mitigating the path loss of radio waves by applying beamforming technology.

Beamforming technology may also be used for transmission of overhead channels including system information, such as a Broadcast Channel (BCH), a Synchronization Channel (SCH), and so forth, as well as transmission of data channels. In particular, a BCH needs to be stably received by all terminals in a cell in a sense that the BCH includes system information for network access.

Therefore, there is a need for a technique for applying beamforming to transmission of a BCH to enable terminals in a cell to effectively and stably receive the BCH.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies of the prior art, it is a primary object to provide a method and apparatus for transmitting and receiving information in a communication system.

Various aspects of the present disclosure also provide a method and apparatus for receiving a Broadcast Channel (BCH) of a serving cell while maintaining a stable interference level in a cellular communication system.

Various aspects of the present disclosure also provide a method and apparatus for effectively removing an interference signal when receiving a BCH of a serving cell in a cellular communication system.

Various aspects of the present disclosure also provide a method and apparatus for transmitting BCHs including identical contents in different directions in a cellular communication system.

Various aspects of the present disclosure also provide a method and apparatus for combining and receiving BCHs received in different directions in a cellular communication system.

Other objects to be provided in the present disclosure may be understood by embodiments described below.

According to one of various aspects of the present disclosure, there is provided a method for transmitting a Broadcast Channel (BCH) in a cellular communication system, the method including repeating symbols comprising information about the BCH, code-covering the repeated symbols with codes selected from a previously given code set, subcarrier-mapping the code-covered symbols, and transmitting the subcarrier-mapped symbols in one frame by using different beams corresponding to the selected codes.

According to one of various aspects of the present disclosure, there is also provided a method for receiving a Broadcast Channel (BCH) in a cellular communication system, the method including configuring a reception vector comprising a predetermined number of symbols that comprise information about the BCH from a reception signal, detecting codes of a previously given code set, which are applied to code-covering of the symbols, from the reception vector, detecting a beam index used in transmission of the BCH, based on a code index of the detected code, and determining a boundary of a frame by using the beam index.

According to one of various aspects of the present disclosure, there is also provided an apparatus for transmitting a Broadcast Channel (BCH) in a cellular communication system, the apparatus including a symbol repetition unit configured to repeat symbols comprising information about the BCH, a code covering unit configured to code-cover the repeated symbols with codes selected from a previously given code set, a subcarrier-mapper configured to subcarrier-map the code-covered symbols, and a beamforming transmitter configured to transmit the subcarrier-mapped symbols in one frame by using different beams corresponding to the selected codes.

According to one of various aspects of the present disclosure, there is also provided an apparatus for receiving a Broadcast Channel (BCH) in a cellular communication system, the apparatus including a code-decovering unit configured to detect codes of a previously given code set, which are applied to code-covering of the symbols, from a reception vector comprising a predetermined number of symbols that comprise information about the BCH, a beam detector configured to detect a beam index used in transmission of the BCH, based on a code index of the detected code, and a frame boundary detector configured to determine a boundary of a frame by using the beam index.

Other aspects, advantages, and salient features of the disclosure will become apparent to those skilled in the art from the following detailed description, which, taken in conjunction with the annexed drawings, discloses certain embodiments in accordance with the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of certain embodiments in accordance with the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
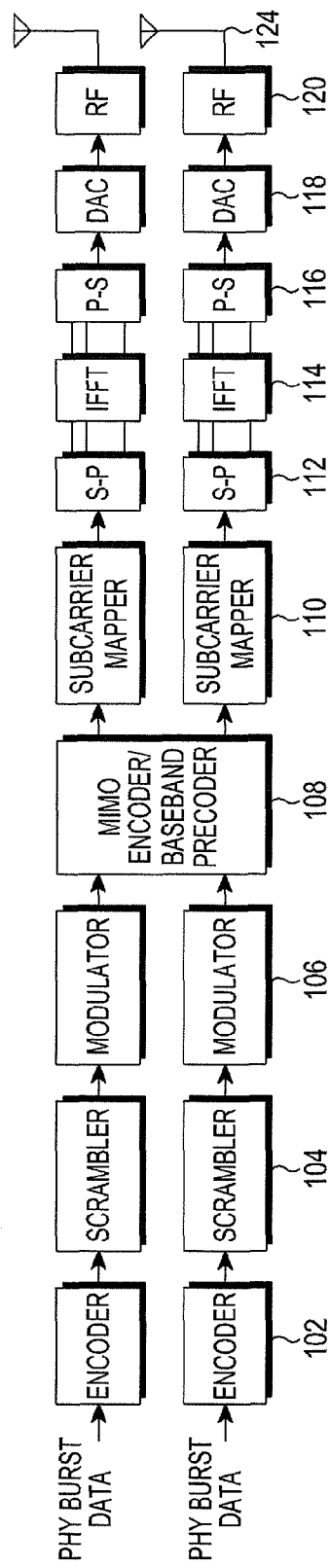
FIG. 1 is a block diagram showing a transmission end of a general cellular communication system according to embodiments of the present disclosure.

FIG. 1 is a block diagram showing a transmission end of a general cellular communication system according to embodiments of the present disclosure.

Figure 2:
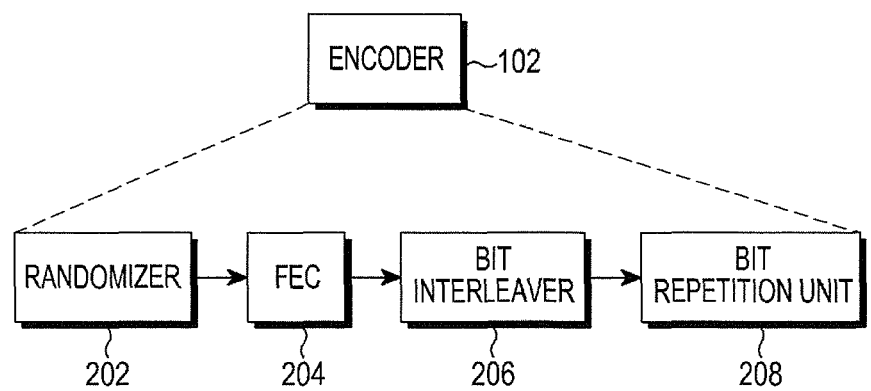
FIG. 2 shows a decoding structure for overcoming a signal reception loss according to embodiments of the present disclosure.

Referring to FIG. 1, burst data of a Physical Layer (PHY), which corresponds to each of a plurality of data streams, is converted into code symbols by being encoded by an encoder 102. The encoder 102 can be configured, for example, as shown in FIG. 2. The configuration shown in FIG. 2 will be described later.

The code symbols are scrambled with a predetermined scrambling code by a scrambler 104, and modulated using a predetermined modulation scheme by a modulator 106, and then input to a Multi-Input Multi-Output (MIMO) encoder/baseband precoder 108. The MIMO encoder/baseband precoder 108 converts a plurality of modulation streams, which are input through encoding/scrambling/modulation, into a plurality of MIMO streams, and applies a predetermined precoding matrix to the plurality of MIMO streams to generate a plurality of precoded streams. The plurality of precoded streams are transferred to a plurality of Radio Frequency (RF) paths, respectively.

Each RF path converts the input precoded stream into an RF signal and transmits the RF signal via a corresponding antenna. Signal processing in each RF path will be described below in detail.

A subcarrier mapper 110 rearranges and maps symbols of the input precoded stream to subcarriers. A serial-to-parallel converter S-P 112 converts the subcarrier-mapped symbols into parallel streams. An Inverse Fast Fourier Transform (IFFT) unit 114 performs IFFT on the parallel streams. The output of the IFFT unit 114 is converted into a serial stream by a parallel-to-serial converter P-S 116.

A digital-to-analog converter DAC 118 converts the serial stream into an analog signal that is converted into an RF signal by an RF unit 120 and then radiated over the air via an antenna 124 of a corresponding RF path.

Figure 3:
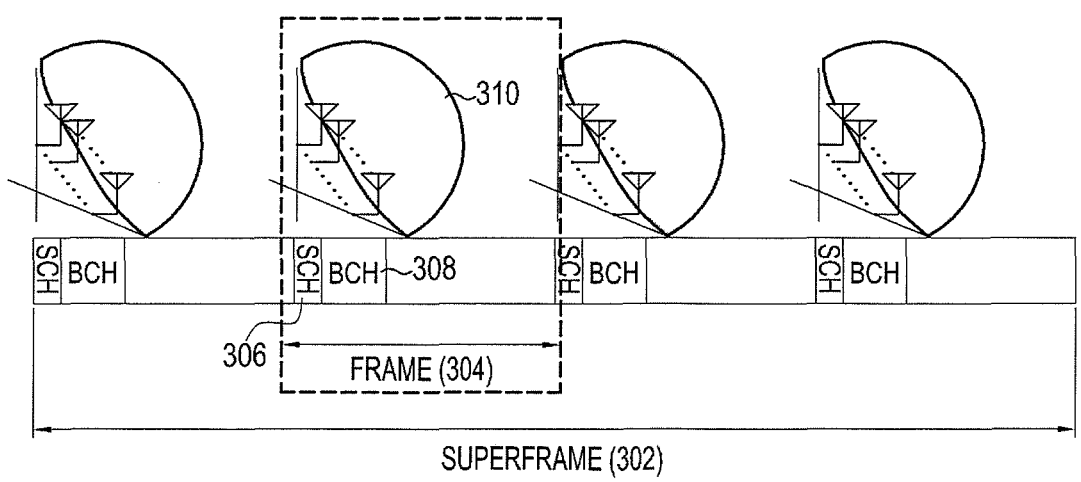
FIG. 3 is a diagram describing transmission of a Synchronization Channel (SCH) and a Broadcast Channel (BCH) in a general cellular communication system according to embodiments of the present disclosure.

FIG. 3 is a diagram describing transmission of a Synchronization Channel (SCH) and a Broadcast Channel (BCH) in a general cellular communication system according to embodiments of the present disclosure, in which a frame structure that can be used in the transmission end shown in FIG. 1 is illustrated.

Referring to FIG. 3, a superframe 302 includes a predetermined number of (for example, 4) frames, and an SCH 306 is transmitted in a predetermined position of each frame 304. Herein, for example, the first part of a frame starts with an SCH. A receiver, that is, a terminal detects the SCH 306 to recognize a start of a frame and performs frame synchronization. Together with the SCH 306, a BCH 308 is transmitted in a predefined position. In this example, the BCH 308 is transmitted immediately after the SCH 306. The BCH 308 is provided from a base station to terminals in a cell and includes system information the terminals need for an access to the base station. As such, the SCH 306 and the BCH 308 are transmitted once, respectively, in each frame, and the SCH 306 and the BCH 308 are transmitted across a full region 310 covered by antennas of the base station.

If a microwave band is applied to communication between the base station and the terminals, a more serious path loss may occur additionally than with a low-frequency band used in general cellular communication. In the communication system to which beamforming is not applied, as shown in FIG. 1, encoding that provides a high encoding gain is used to overcome the path loss.

FIG. 2 shows an encoding structure for overcoming a path loss according to embodiments of the present disclosure. Herein, an encoding structure applicable to the encoder 102 shown in FIG. 1 will be described.

Referring to FIG. 2, the encoder 102 randomizes bits of the input burst data through a randomizer 202, encodes the randomized bits through a Forward Error Correction (FEC) encoder 204, interleaves the encoded bits through a bit interleaver 206, and repeats symbols in a predetermined position by a bit repetition unit 208 to generate code symbols. In this way, the encoding structure for overcoming the path loss needs to obtain a high encoding gain by reducing a code rate, such as by repeating a codeword.

When an additional path loss of a microwave band is overcome merely with an encoding gain, a Signal-to-Noise Ratio (SNR) region of a receiver becomes excessively low, such that an inefficient operation such as degradation of channel estimation performance may occur in the receiver.

Figure 4:
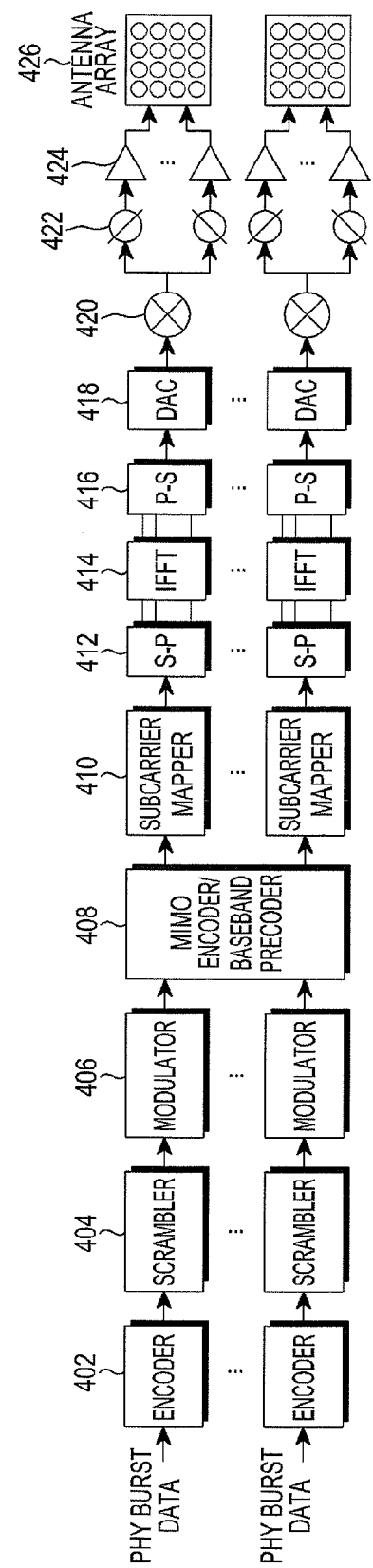
FIG. 4 is a block diagram showing a transmission end of a communication system that uses analog Beam-Forming (BF) according to embodiments of the present disclosure.

FIG. 4 is a block diagram showing a transmission end of a communication system that uses analog BeamForming (BF) according to embodiments of the present disclosure.

Referring to FIG. 4, burst data of a PHY, which corresponds to each of a plurality of data streams, is converted into code symbols by being encoded by an encoder 402. The encoder 402 can be configured, for example, as shown in FIG. 2. The code symbols are scrambled with a predetermined scrambling code by a scrambler 404, modulated in a predetermined modulation scheme by a modulator 406, and input to a MIMO encoding/baseband precoder 408. The MIMO encoding/baseband precoder 408 converts a plurality of modulation streams, which are input through encoding/scrambling/modulation, into a plurality of MIMO streams, and applies a predetermined precoding matrix to the plurality of MIMO streams to generate a plurality of precoded streams. The plurality of precoded streams is transferred to a plurality of RF paths, respectively.

Each RF path converts the input precoded stream into an RF signal and transmits the RF signal via a corresponding antenna array. Signal processing in each RF path will be described below in detail.

A subcarrier mapper 410 rearranges and maps symbols of the input precoded stream to subcarriers. A serial-to-parallel converter S-P 412 converts the subcarrier-mapped symbols into parallel streams. An IFFT unit 414 performs IFFT on the parallel streams. The output of the IFFT unit 414 is converted into a serial stream by a parallel-to-serial converter P-S 416.

A digital-to-analog converter DAC 418 converts the serial stream into an analog signal that is converted into an RF signal by a frequency converter or mixer 420 and then input to a plurality of phase shifters 422 and a plurality of power amplifiers 424 that perform analog BF. The RF signal output through each RF path is beamformed in the plurality of phase shifters 422 and the plurality of power amplifiers 424 that correspond to a plurality of antenna devices of a corresponding antenna array 426. The phase shifters 422 and the power amplifiers 424 apply a phase and a gain corresponding to the RF path to the input signal to generate a beamformed signal which is then radiated over the air in a beam having predetermined beam direction, beam width, and beam gain via the antenna array 426 of the RF path.

The shown transmission end secures both a BF-based gain and an encoding gain based on code rate reduction, thus overcoming an additional path loss occurring in a microwave band. However, in signal transmission using analog BF, the strength of an inter-cell interference signal largely changes from frame to frame in a terminal, resulting in degradation of reception performance, and therefore, efficient interference processing is required.

Figure 5:
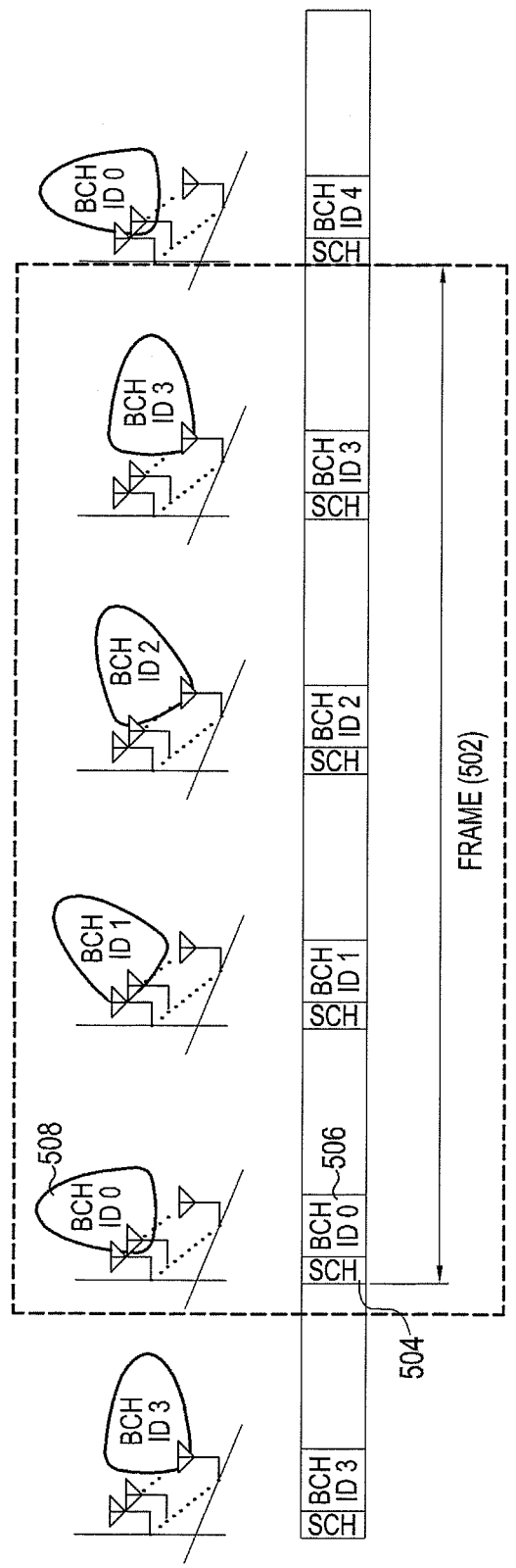
FIG. 5 is a diagram describing an example of transmission of an SCH and a BCH in a communication system using analog BF according to embodiments of the present disclosure.

FIG. 5 is a diagram describing an example of transmission of an SCH and a BCH in a communication system using analog BF, in which a frame structure that can be used in the transmission end shown in FIG. 4 is illustrated according to embodiments of the present disclosure.

Referring to FIG. 5, each frame 502 can include a plurality of (for example, four) SCHs 504 that are periodically disposed in time regions having predetermined intervals. The receiver, that is, the terminal detects the SCH 504 to acquire frame synchronization. Immediately after the SCH 504, a BCH 506 is transmitted and each BCH 506 is identified by a BCH identifier (BCH ID). The BCH 506 is provided from a base station to terminals in a cell, and includes system information the terminals need to access to the base station.

Herein, BCHs further include different BCH IDs according to their positions, together with common system information. This is intended to allow a terminal that has obtained symbol synchronization to obtain frame synchronization upon recognizing a BCH ID after receiving a BCH.

The plurality of BCHs 506 is transmitted in beams having different beam directions for transmission to a full region covered by a system. The base station sweeps the beams in each direction and transmits the plurality of BCHs 506 through a plurality of beams. To this end, the BCHs 506 can be distributed in the frame 502 at predetermined intervals for corresponding directions. More specifically, the BCH 506 corresponding to BCH ID 0 is transmitted in Beam #1 508 and the BCH corresponding to BCH ID 1 is transmitted in Beam #2. Likewise, the BCH corresponding to BCH ID 2 and the BCH corresponding to BCH ID 3 are transmitted in Beam #3 and Beam #4, respectively. In this case, each SCH 504 can be beamformed and transmitted in the same direction as its adjacent BCH 506.

To obtain frame (or subframe) synchronization after obtaining symbol synchronization through detection of the SCH 504, the terminal needs to determine to which SCH in the frame 502 the detected SCH corresponds. For example, if the terminal succeeds in detecting an SCH transmitted in a third direction, the terminal can obtain symbol synchronization, but does not know a frame boundary yet. Therefore, a terminal having obtained symbol synchronization obtains system information and recognizes a BCH ID using information about a BCH (or BCH information), thus recognizing a frame boundary.

More specifically, each BCH 506 includes information indicating the order in which the BCH is transmitted in the frame 502, for example, a sweep index or a BCH ID. The terminal obtains symbol synchronization through the SCH 504 and detects the BCH 506 to recognize a BCH ID, thus estimating a frame boundary. To be more specific, the terminal can know in advance the length of the frame 502 and the number of BCHs 506 or an interval between BCHs 506, or can recognize them through a corresponding BCH. For example, if the terminal detects a BCH transmitted third from the first, the terminal can recognize that the system operates a total of four sweep indices and the detected BCH corresponds to the third one, such that the terminal can calculate a start position of each frame from an interval between BCHs.

Figure 6:
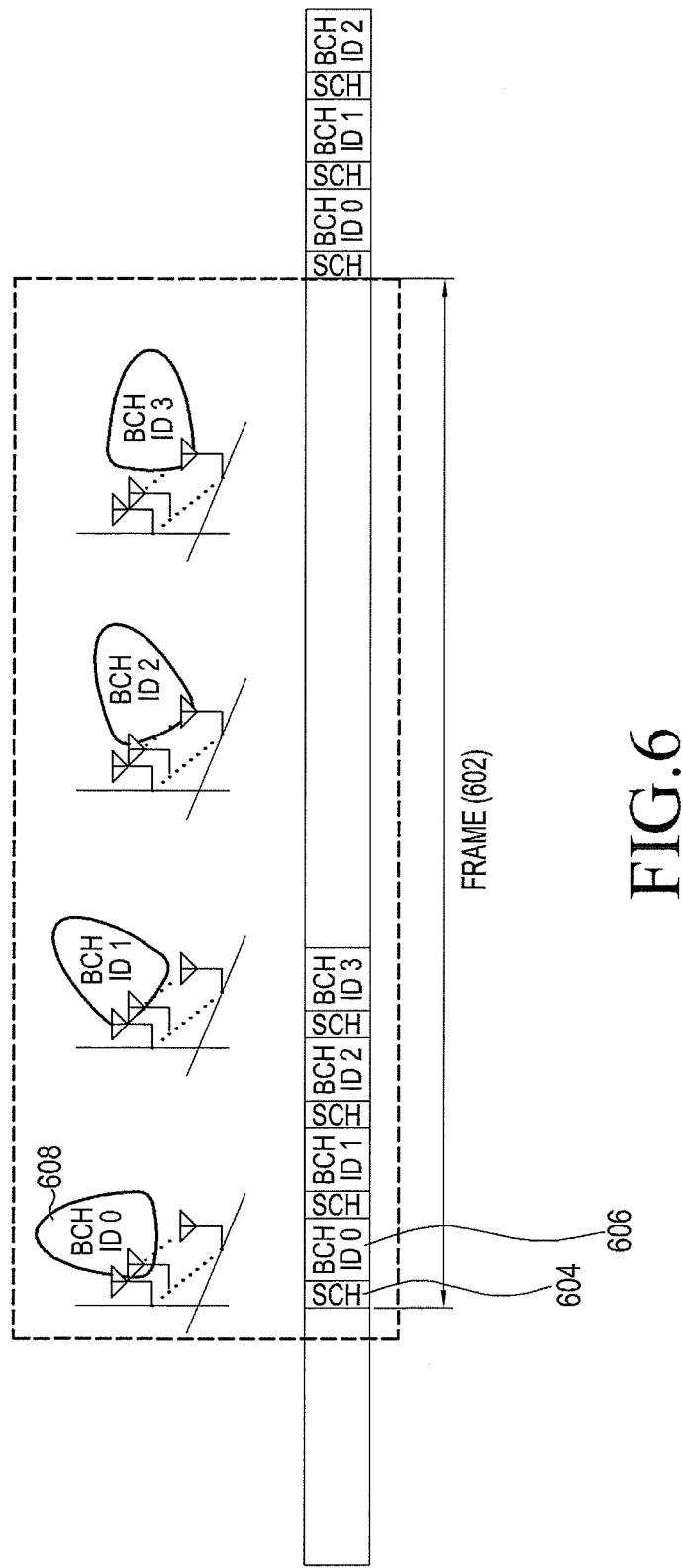
FIG. 6 is a diagram describing another example of transmission of an SCH and a BCH in a communication system using analog, BF according to embodiments of the present disclosure.

FIG. 6 is a diagram describing another example of transmission of an SCH and a BCH in a communication system using analog BF according to embodiments of the present disclosure, in which a frame structure that can be used in the transmission end shown in FIG. 4 is illustrated.

Referring to FIG. 6, a first part of each frame 602 starts with regions including a plurality of, for example, four pairs of SCHs 604 and BCHs 606. More specifically, each frame 602 starts with the first SCH 604 immediately after which the first BCH 606 is disposed. Immediately after the first BCH 606, the second SCH and the second BCH are transmitted. Likewise, thereafter, the third SCH and the third BCH and then the fourth SCH and the fourth BCH are transmitted. All of the BCHs 606 further include common system information and different BCH IDs that differ according to positions of the BCHs 606.

The plurality of BCHs 606 are transmitted in beams having different beam directions for transmission across a full region covered by the system. The base station sweeps the beams in the respective directions, and transmits the plurality of BCHs 606 in the plurality of beams. More specifically, the BCH 606 corresponding to BCH ID 0 is transmitted in Beam #1 608 and the BCH corresponding to BCH ID 1 is transmitted in Beam #2. Likewise, the BCH corresponding to BCH ID 2 and the BCH corresponding to BCH ID 3 are transmitted in Beam #3 and Beam #4. Each SCH 604 can be beamformed and transmitted in the same direction as the corresponding BCH 606.

After obtaining symbol synchronization through detection of the SCH 604, the terminal recognizes a frame boundary from information about the BCH 606. More specifically, each BCH 606 includes information indicating the order in which the BCH 606 is swept in the frame 602, for example, a sweep index or a BCH ID. The terminal obtains symbol synchronization through the SCH 604 and detects the BCH 606 to recognize the BCH ID, thus estimating a frame boundary. To be more specific, the terminal knows in advance the length of the frame 602, the number of BCHs 606, and a length of each BCH 60. For example, if the terminal detects the BCH 606 that has been transmitted third from the first, the terminal can calculate a start position of the frame 602 from the length of each BCH 606.

When a BCH transmission structure as shown in FIGS. 5 and 6 is used, a BCH is transmitted together with beam sweeping in one frame, taking account of every space of a cell, such that BCHs need to include different BCH IDs for different directions. Thus, the terminal may not be capable of combining and receiving signals of BCHs transmitted in different directions for reception performance improvement.

Figure 7:
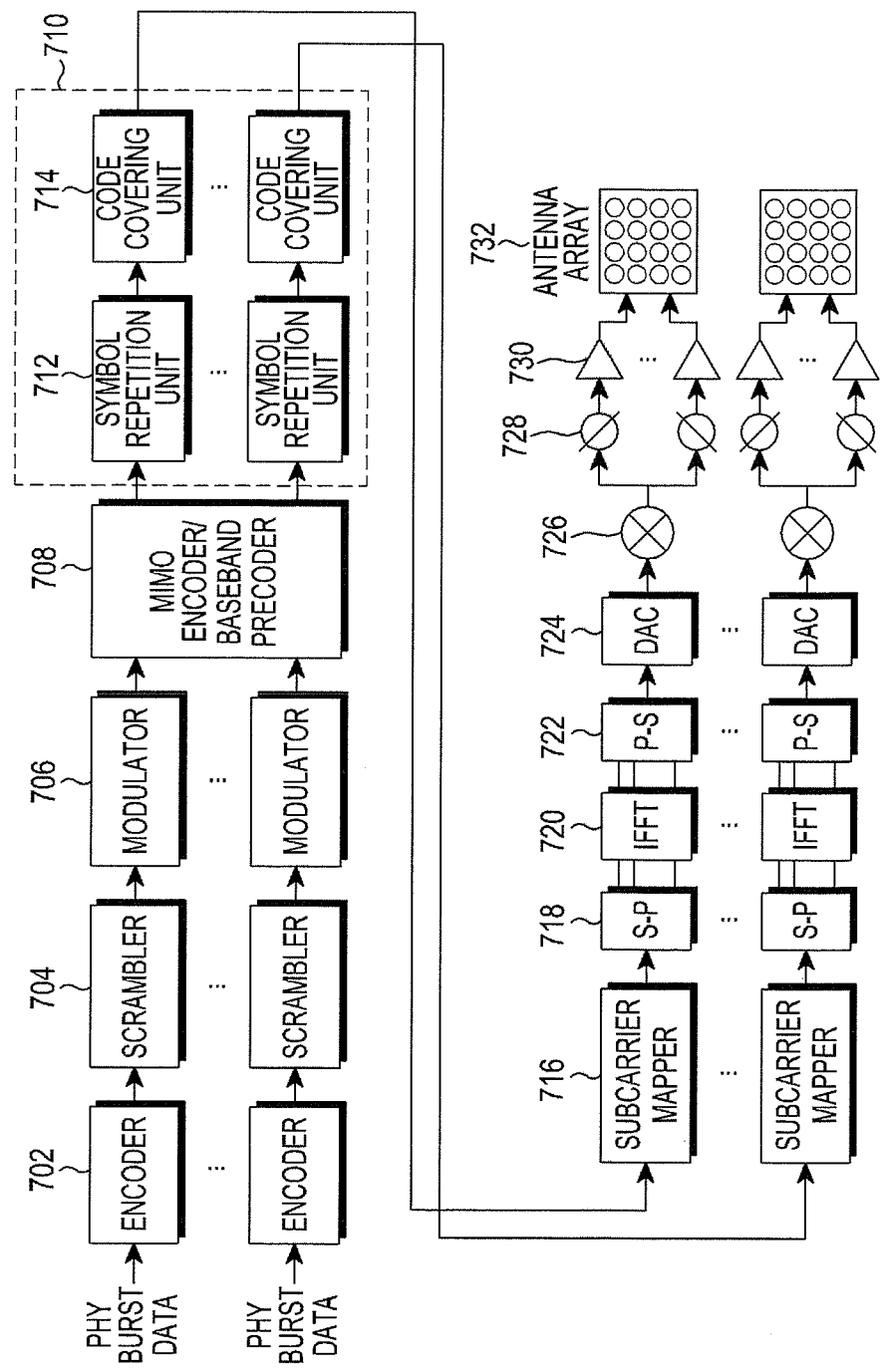
FIG. 7 is a block diagram showing a transmission end of a BF-based cellular communication system according to embodiments of the present disclosure.

FIG. 7 is a block diagram showing a, transmission end of a BF-based cellular communication system according to embodiments of the present disclosure.

Referring to FIG. 7, burst data of a PHY, which corresponds to each of a plurality of data streams including BCH information, is converted into code symbols by being encoded by an encoder 702. The encoder 702 can be configured, for example, as shown in FIG. 2. The code symbols are scrambled with a predetermined scrambling code by a scrambler 704, modulated using a predetermined modulation scheme by a modulator 706, and input to a MIMO encoder/baseband precoder 708.

The MIMO encoder/baseband precoder 708 converts a plurality of modulation streams, which are input through encoding/scrambling/modulation, into a plurality of MIMO streams using a MIMO encoding scheme such as Space-Time Block Coding (STBC), and applies a predetermined precoding matrix to the plurality of MIMO streams to generate a plurality of precoded streams. The plurality of precoded streams is transferred to a plurality of RF paths. Although not shown in FIG. 7, the MIMO encoder/baseband precoder 708 may not be provided, and in this case, the modulation symbols output from the modulator 706 can be input to RF paths.

Each RF path converts the input precoded stream into an RF signal and transmits the RF signal via a corresponding antenna array. Signal processing in each RF path will be described below in detail.

A symbol repetition and code covering unit 710 receives symbols of the precoded stream, repeats the symbols a predetermined number of repetitions through a symbol repetition unit 712, and covers or masks the repeated symbols with a code selected from a predetermined code set through a code covering unit 714. A subcarrier mapper 716 rearranges the code-covered symbols to map the symbols to frequency tones determined by sub-channelization. A serial-to-parallel converter S-P 718 converts the subcarrier-mapped symbols into parallel streams. Sub-channelization is performed such that the symbols repeated a predetermined number of repetitions may not be separated in time and frequency. This is because it is necessary to maintain the code covering characteristics of the repeated symbols even after its passage through channels. An IFFT unit 720 performs IFFT on the parallel streams, and the output of the IFFT unit 720 is converted into a serial stream by a parallel-to-serial converter P-S 722.

A digital-to-analog converter DAC 724 converts the serial stream into an analog signal which is then converted into an RF signal through a frequency converter 726 and input to a plurality of phase shifters 728 and a plurality of power amplifiers 730 that form an analog beamforming unit. An RF signal output through each RF path is beamformed in the plurality of phase shifters 728 and the plurality of power amplifiers 730 corresponding to a plurality of antenna devices of a corresponding antenna array 732. The phase shifters 728 and the power amplifiers 730 apply a phase and a gain corresponding to the RF path to the input signal to generate a beamformed signal which is then radiated over the air in a beam having predetermined beam direction, beam width, and beam gain via the antenna array 732 of the RF path.

Figure 8:
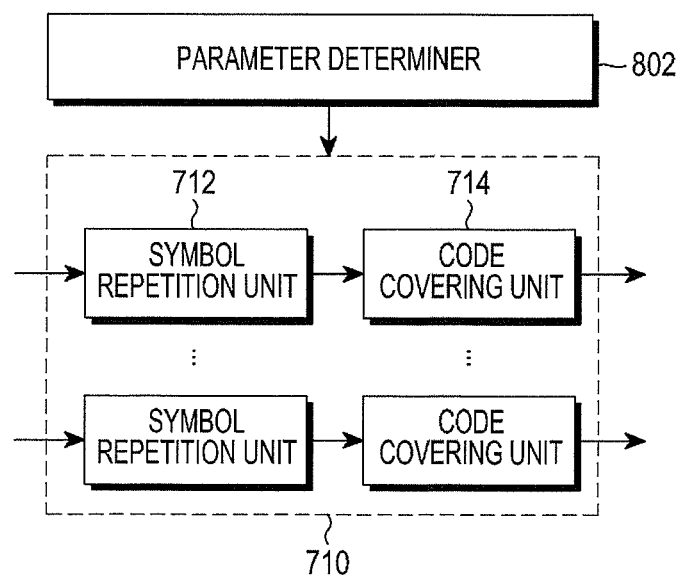
FIG. 8 shows a detailed structure of symbol repetition and code covering according to embodiments of the present disclosure.

FIG. 8 shows a detailed structure of symbol repetition and code covering according to embodiments of the present disclosure.

Referring to FIG. 8, the symbol repetition unit 712 repeats, R times, symbols that form a precoded stream. For example, if a predetermined number of repetitions, R, is 8, one input symbol s is repeated as in [s s s s s s s s]. The symbol vector s generated by symbol repetition is covered with a selected code c by the code covering unit 714. Code covering is performed through $s \otimes c$, which is an element wise product $\otimes$ of the repetition symbol vector s and the code vector c, and code covering is also called masking. The code (masking code) c can be, for example, a Walsh Hadamard code.

A parameter determiner 802 determines the number of repetitions, R, and the code c, which are parameters necessary for operations of the symbol repetition unit 712 and the code covering unit 714. For example, the number of repetitions, R, can be determined based on one or more of a deployment of a base station and a gain (related to the total number of antenna devices) that can be obtained by used beamforming. Information about the number of repetitions R can be, for example, notified to terminals in a cell through an SCH. In another example, the number of repetitions, R, can be a value that is set in advance according to system standards and selection of a system operator.

The code c has a predetermined code length Lc and is selected from a code set having a size of Nc which is given in advance or is signaled from a network. For example, a Walsh code set having Lc=8 and Nc=8 can be configured in the form of the following matrix.

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & 1 & 1 & 1 & -1 & 1 \\ 1 & -1 & 1 & 1 & 1 & -1 & 1 & 1 \\ 1 & 1 & 1 & 1 & -1 & -1 & -1 & -1 \\ 1 & -1 & 1 & -1 & -1 & 1 & -1 & 1 \\ 1 & 1 & -1 & 1 & -1 & -1 & 1 & -1 \\ 1 & -1 & 1 & 1 & -1 & 1 & -1 & -1 \end{bmatrix}$$

In this matrix, 8 rows indicate 8 codes, respectively (Nc=8), which can be sequentially indicated by $c_0, \ldots, c_7$. In this example, the code $c_0$ is [1 1 1 1 1 1 1 1] and the code $c_7$ is [1 −1 1 1 −1 1 −1 −1].

The parameter determiner 802 determines the code c used for code covering using a function of f (R, IDcell, w) based on the number of repetitions, R, a cell identifier of a base station, IDcell, and the number of sweeps in a frame for beamforming, Ns. Herein, w denotes a sweep index indicating the order in which the BCH's sequence is transmitted in the frame (w=0, ..., Ns−1). In other words, w indicates a transmission order of a BCH or a beam index used in transmission of the BCH.

For example, a code index of the code c can be determined as follows:

$$\text{Code } c = (\text{IDcell} + w) \bmod R \qquad (1),$$

where w denotes a sweep index indicating the order in which the BCH is transmitted in the frame (w=0, ..., Ns−1). If beams are sequentially used according to an order in which BCHs are transmitted in a frame, for example, if the first beam is used in the first sweep and the second beam is used in the second sweep, then a sweep index can be identical to a beam index.

In Equation (1), for R=8, Ns=7, IDcell=3, a code for each of a total of 8 sweep directions (that is, beam directions) can be determined as follows:

$$w = 0 \Rightarrow (3 + 0) \bmod 8 = 3 \Rightarrow c_3$$
$$w = 1 \Rightarrow (3 + 1) \bmod 8 = 4 \Rightarrow c_4$$
$$\ldots$$
$$w = 5 \Rightarrow (3 + 5) \bmod 8 = 0 \Rightarrow c_0$$
$$w = 6 \Rightarrow (3 + 6) \bmod 8 = 1 \Rightarrow c_1$$
$$w = 7 \Rightarrow (3 + 7) \bmod 8 = 2 \Rightarrow c_2$$

In the foregoing example, the symbol vector [s s s s s s s s] generated by symbol repetition is covered with the code $c_3$ for the first beam (w=0). That is, [s s s s s s s s] is covered with $c_3$=[1 −1 1 1 1 −1 1 1], such that a result [s −s s s s −s s s] is output from the code covering unit 714.

In Equation (1), for R=8, Ns=5, IDcell=5, a code for each of a total of 6 sweep directions (that is, beam directions) can be determined as follows:

$$w = 0 \Rightarrow (5 + 0) \bmod 8 = 5 \Rightarrow c_5$$
$$\ldots$$
$$w = 3 \Rightarrow (5 + 3) \bmod 8 = 0 \Rightarrow c_0$$
$$w = 4 \Rightarrow (5 + 4) \bmod 8 = 1 \Rightarrow c_1$$
$$w = 5 \Rightarrow (5 + 5) \bmod 8 = 2 \Rightarrow c_2$$

In the foregoing example, for w=5, the symbol vector [s s s s s s s s] is covered with $c_2$, such that a result [s s −s s s s −s s] is output.

The covered symbols generated in this way are input to the subcarrier mapper 716. If sub-channelization is used, the subcarrier mapper 716 performs subcarrier mapping in units of R frequency tones and time symbols, such that the repeated symbols, even after passing through sub-channelization, are transmitted together while being physically adjacent to each other.

Figure 9:
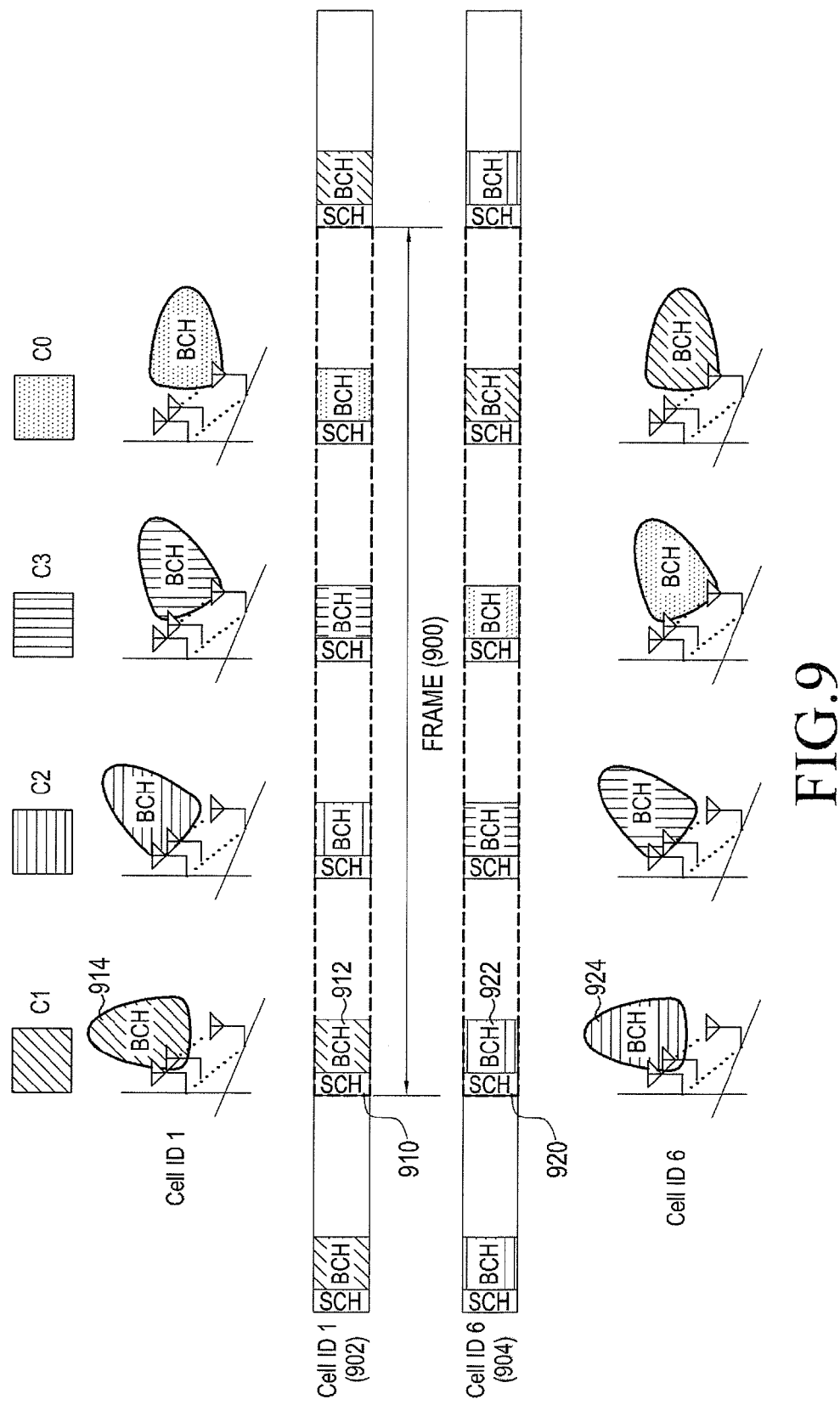
FIG. 9 shows an example of transmission of an SCH and a BCH according to embodiments of the present disclosure.

FIG. 9 shows an example of transmission of an SCH and a BCH according to embodiments of the present disclosure, in which a frame structure that can be used in the transmission end shown in FIG. 7 is illustrated.

Referring to FIG. 9, a frame 900 transmitted in each of cells 902 and 904 includes a plurality of, for example, four SCHs 910 and 920 that are periodically disposed at predetermined intervals. The receiver, that is, the terminal can obtain frame synchronization by detecting the SCHs 910 and 920. Immediately after each of the SCHs 910 and 920, each of BCHs 912 and 922 is transmitted. The BCHs 912 and 922 are transmitted from a base station to terminals in a cell, and include system information necessary for the terminals to access the base station. BCHs transmitted in one frame in the same cell can include identical system information or can further include BCH IDs in addition to the identical system information. If the BCHs carry identical system information, the terminal combines and receives the BCHs corresponding to different beam directions, thus improving reception performance. If the BCHs further include BCH IDs, such reception performance improvement may not be obtained.

The plurality of BCHs 912 and 922 is transmitted in beams having different beam directions for transmission across a full region covered by the system. The base station sweeps the beams for respective directions and transmits the plurality of BCHs 912 and 922 in the plurality of beams. Each BCH is code-covered with a code selected based on a cell identifier IDcell, a sweep index, and the number of repetitions R. In an example of Equation (1), for R=4 and Ns=4, the following code is used according to an order of sweeping:

Cell ID 1 (902): $c_1$ $c_2$ $c_3$ $c_0$
Cell ID 6 (904): $c_2$ $c_3$ $c_0$ $c_1$.

More specifically, in Cell #1 902 having Cell ID 1, the BCH 912 having BCH ID 0 is transmitted in Beam #1 914 of Cell #1 902 using a code $c_1$, and the BCH having BCH ID 1 is transmitted in Beam #2 using a code $c_2$. Likewise, the BCH having BCH ID 2 and the BCH having BCH ID 3 are transmitted in Beam #3 and Beam #4 using a code $c_3$ and a code $c_0$, respectively. Similarly, in Cell #6 904 having Cell ID 6, the BCH 922 having BCH ID 0 is transmitted in Beam #1 924 of Cell #6 904 using the code $c_2$, and the BCH having BCH ID 1 is transmitted in Beam #2 using the code $c_3$. Likewise, the BCH having BCH ID 2 and the BCH having BCH ID 3 are transmitted in Beam #3 and Beam #4 using the code $c_0$ and code $c_1$, respectively.

In this case, the SCHs 910 and 920 can be beamformed and transmitted in the same directions as their subsequent BCHs 912 and 922, respectively.

Figure 10:
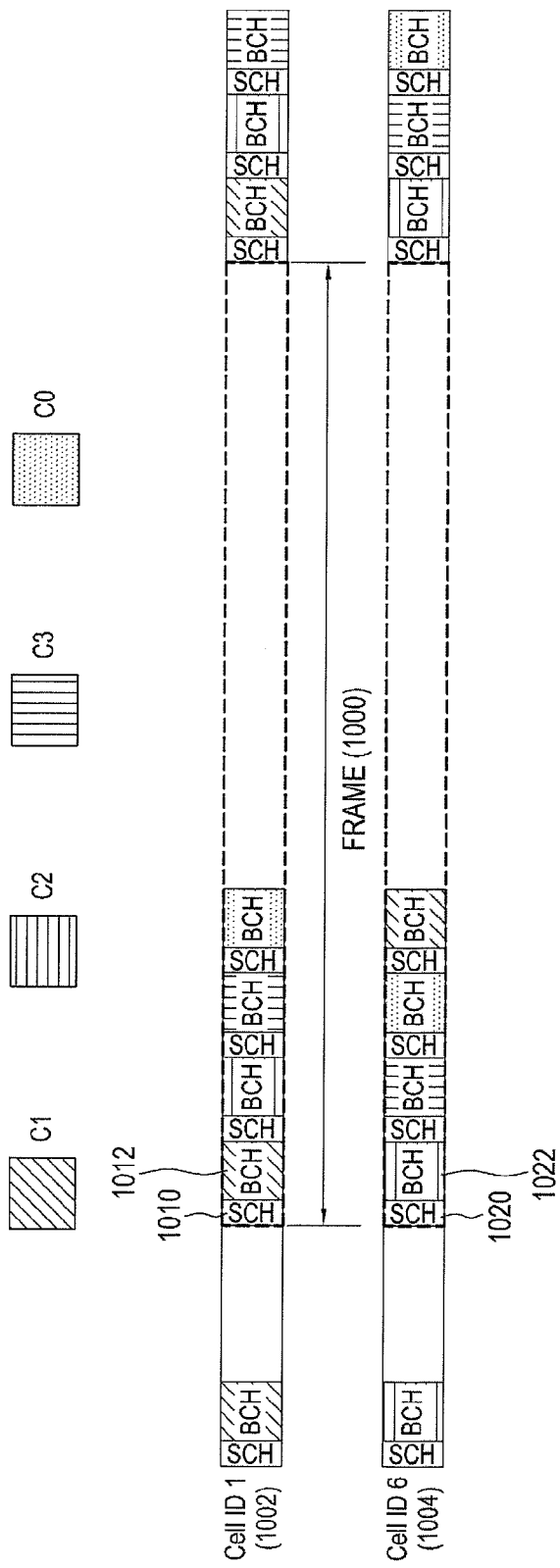
FIG. 10 is a diagram describing another example of transmission of an SCH and a BCH according to embodiments of the present disclosure.

FIG. 10 is a diagram describing another example of transmission of an SCH and a BCH according to embodiments of the present disclosure, in which a frame structure that can be used in the transmission end shown in FIG. 7 is illustrated.

Referring to FIG. 10, a first part of a frame 1000 transmitted in each of cells 1002 and 1004 starts with a plurality of, for example, four pairs of SCHs 1010 and 1020 and BCHs 1012 and 1022. More specifically, each frame 1000 starts with the SCHs 1010 and 1020 immediately after which the first BCHs 1012 and 1022 are disposed, respectively. Immediately after the first BCHs 1012 and 1022, the second SCH and the second BCH are transmitted. Likewise, thereafter, the third SCH and the third BCH and then the fourth SCH and the fourth BCH are transmitted. The BCHs transmitted in one frame in the same cell can include identical system information or can further include BCH IDs as well as identical system information. If the BCHs carry identical system information, the terminal can combine and receive the BCHs corresponding to different beam directions, thus improving reception performance. On the other hand, if the BCHs further include BCH IDs, such reception performance improvement may not be obtained.

The plurality of BCHs 1012 and 1022 is transmitted in beams having different beam directions for transmission across a full region covered by the system. The base station transmits the plurality of BCHs 1012 and 1022 in the plurality of beams while sweeping the beams for respective directions, and each BCH is code-covered with a code selected based on a cell identifier IDcell, a sweep index, and the number of repetitions R. In Equation (1), for R=4 and Ns=4, an example will be described below.

In Cell #1 1002 having Cell ID 1, the BCH 1012 having BCH ID 0 is transmitted in Beam #1 of Cell #1 1002 using a code $c_1$, and the BCH having BCH ID 1 is transmitted in Beam #2 using a code $c_2$. Likewise, the BCH having BCH ID 2 and the BCH having BCH ID 3 are transmitted in Beam #3 and Beam #4 using, codes $c_3$ and $c_0$, respectively. Similarly, in Cell #6 1004 having Cell ID 6, the BCH 1022 having BCH ID 0 is transmitted in Beam #1 of Cell #6 1004 using the code $c_2$, and the BCH having BCH ID 1 is transmitted in Beam #2 using the code $c_3$. Likewise, the BCH having BCH ID 2 and the BCH having, BCH ID 3 are transmitted in Beam #3 and Beam #4 using the code $c_0$ and code $c_1$, respectively.

The SCHs 1010 and 1020 can be beamformed and transmitted in the same directions as their subsequent BCHs 1012 and 1022, respectively.

Figure 11:
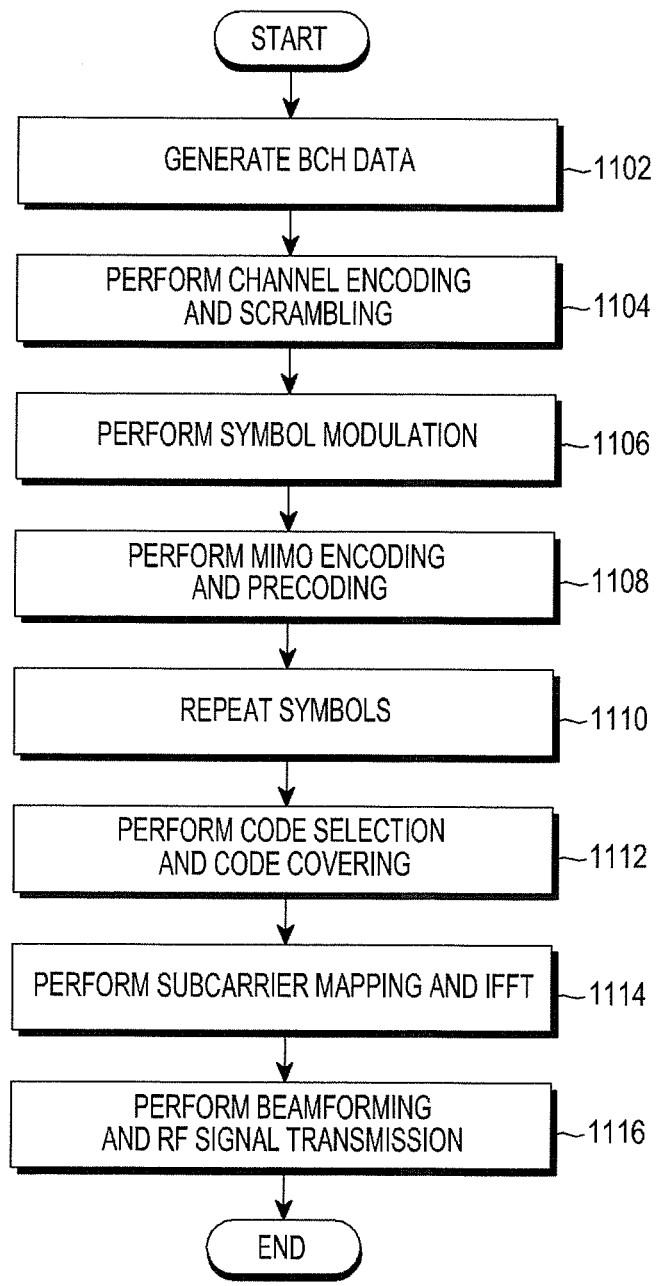
FIG. 11 is a flowchart showing a transmission operation according to embodiments of the present disclosure.

FIG. 11 is a flowchart showing a transmission operation according, to embodiments of the present disclosure.

Referring to FIG. 11, the transmitter generates burst data to be transmitted in a BCH in step 1102, and performs channel encoding and scrambling with respect to the burst data in step 1104. The transmitter performs symbol modulation with respect to the channel-encoded and scrambled data in step 1106, and performs MIMO encoding and baseband precoding with respect to the modulation symbols generated through symbol modulation to output precoded symbols in step 1108.

In step 1110, the transmitter repeats the precoded symbols a predetermined number of repetitions, R, which is determined according to the transmitter's structure. In step 1112, the transmitter performs code covering with respect to the repeated symbols by using a code selected from a predetermined code set according to a predefined rule based on a cell identifier, a sweep index, and the number of repetitions. In step 1114, the transmitter performs subcarrier-mapping with respect to the covered symbols for IFFT. In step 1116, the transmitter performs transmission through a beamformed RF signal. Subcarrier-mapping is performed for sub-channelization, and the repeated symbols may not be separated on time and frequency resources, even after passing through sub-channelization.

A description will now be made of processing of a reception signal in a terminal.

A BCH signal received in a terminal passes through an RF unit and is reconstructed into a symbol for each frequency tone through Analog-to-Digital Conversion (ADC) and FFT. Let a symbol in each frequency tone be x. Then, x can be expressed as a sum of a transmission symbol t, a channel h, and noise n, that is, x=th+n.

The terminal has recognized the number of repetitions, R, prior to reception of a BCH. Information about R can be notified to terminals in a cell through an SCH or can be a value that is set in advance according to system standards.

The terminal subcarrier demaps and stores the symbols reconstructed through FFT. The symbols are stored in the unit of R that is a previously known value. That is, R symbols $x_1$, $x_2$, ..., $x_R$ are managed as one reception vector x. The reception vector x can be expressed as x=h⊗t+n, in which h indicates a channel vector and n indicates an Additive White Gaussian Noise (AWGN) vector added to the R symbols. Repeated symbols generated in the transmitter are adjacent in time and frequency in spite of sub-channelization, and thus R consecutive symbols can be regarded as passing through very similar channels. Hence, for h=[$h_1$, $h_2$, ..., $h_R$], an approximation such as $h_1 \cong h_2 \cong \ldots \cong h_R = h$ can be made, and the reception vector x can be expressed as x=ht+n. Herein, $h_i$ indicates a channel value an $i^{th}$ symbol has undergone, and every $h_i$ can be considered as having the same h value.

t indicates a transmission vector generated by covering the repeated symbol s with a code c in the transmitter, and an expression t=sc can be made. In this case, c is a code vector selected according to a predetermined rule, and for example, for a code length of Lc, an expression $c=[c_1 \, c_2 \ldots c_{Lc}]$ can be made.

When the reception vector x (=hsc+n) of a BCH is received and processed, the terminal determines in which beam each reception vector is received, by calculating:

$$\hat{c} = \underset{i}{\operatorname{argmax}} x \cdot c_i, \quad (2)$$

where $\hat{c}$ indicates an index of a code used for a BCH of a beam estimated by the terminal, $c_i$ indicates an $i^{th}$ code vector of a previously given code set, and an a·b operation indicates an inner product (element wise product & summation) of a and b. Since a code set of orthogonal codes such as Walsh Hadamard codes is used, $c_i \cdot c_j$ is Lc for i=j, and $c_i \cdot c_j$ is 0 for i≠j.

Thus, by determining i that maximizes $x \cdot c_i$ based on Equation (2), the terminal can estimate $\hat{c}=c_i$. To improve accuracy, the foregoing code estimation procedure can be performed on each of a plurality of reception vectors of the entire transmission data of a BCH.

The terminal can estimate in which beam the BCH currently received in the current frame is transmitted, by using the same code selection rule as used in the transmitter based on the code estimated as described above. Referring to an example of Equation (1), the terminal can obtain the sweep index w by using an index of the estimated code, previously recognized R, and IDcell.

Figure 12:
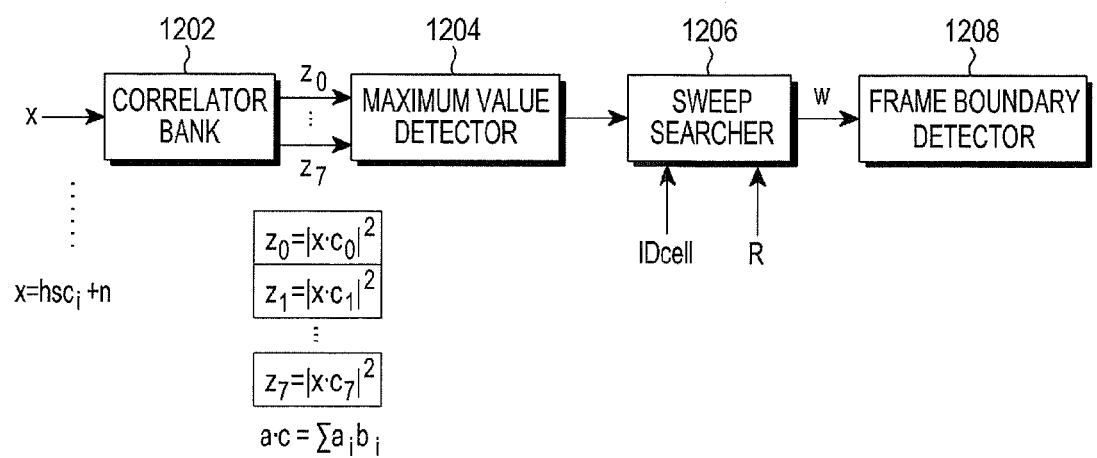
FIG. 12 is a block diagram showing a reception end according to embodiments of the present disclosure.

FIG. 12 is a block diagram showing a reception end according to embodiments of the present disclosure.

Referring to FIG. 12, a correlator bank 1202 and a maximum value detector 1204 perform a code de-covering operation corresponding to the code covering unit 710 of the transmitter.

The reception vector x, including R symbols reconstructed through FFT and subcarrier demapping, is input to the correlator bank 1202. The correlator bank 1202 includes a plurality of correlators corresponding to respective codes of a given code set, and the plurality of correlators calculate an inner product of the reception vector and the codes, $(z_0, \ldots, z_{Nc})$. Herein, the given code set includes 8 codes (Nc=8), and thus the correlator bank 1202 outputs $z_0, \ldots, z_7$. The maximum detector 1204 detects a maximum value among the plurality of inner products, and determines a code index corresponding to the maximum value.

A sweep searcher 1206 estimates the sweep index w indicating the order in which the currently received BCH is swept in the frame, according to a predetermined rule based on the code index. Herein, the predetermined rule can be Equation (1). The number of repetitions, R, required for determination of the sweep index w can be predefined according to system standards, or can be selected by an operator and notified from a base station through an SCH.

A frame boundary detector 1208 estimates a frame boundary based on the sweep index w. For example, for w=0, a frame boundary is estimated as a position preceding a start position of the currently received BCH by a length of an SCH. If w=1 and the frame structure shown in FIG. 9 is used, the frame boundary detector 1208 estimates the frame boundary as a position preceding a start position of the currently received BCH by (a transmission interval of a BCH)+(a length of an SCH). If w=2 and the frame structure shown in FIG. 10 is used, the frame boundary detector 1208 estimates the frame boundary as a position preceding a start position of the currently received BCH by (a length of a BCH)+(2*a length of an SCH).

Figure 13:
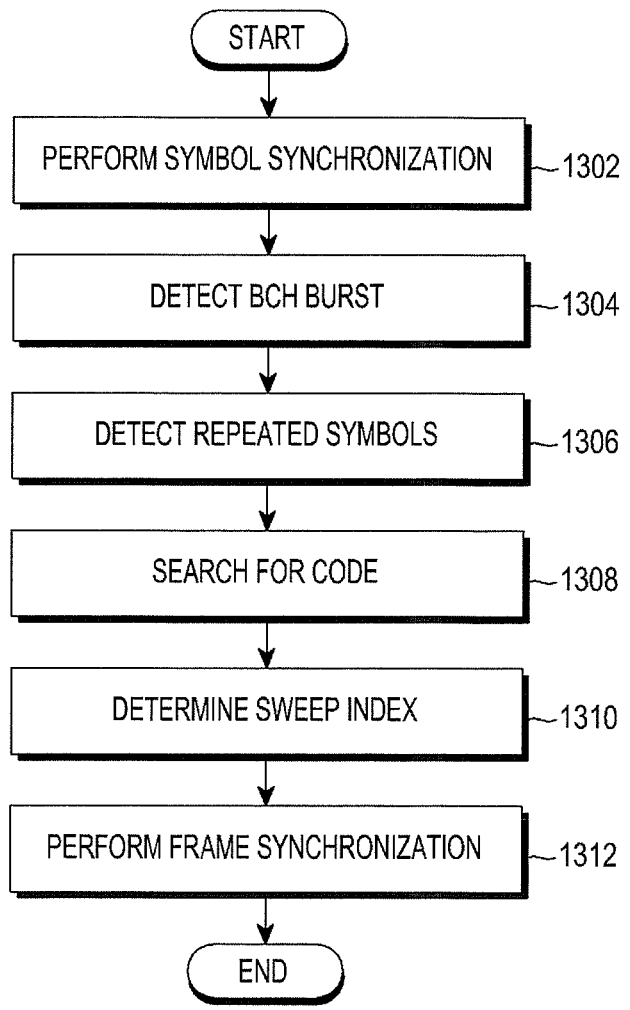
FIG. 13 is a flowchart showing a reception operation according to embodiments of the present disclosure.

FIG. 13 is a flowchart showing a reception operation according to embodiments of the present disclosure.

Referring to FIG. 13, the terminal detects an SCH to obtain symbol synchronization in step 1302, and extracts a burst of a BCH transmitted after the SCH in step 1304. In step 1306, the terminal identifies every R symbols according to a previously known number of repetitions, R, to detect each reception vector including R symbols. In step 1308, the terminal obtains inner products of the reception vectors and all codes of a given code set and compares the inner products to search for a code having the maximum inner product. In step 1310, the terminal determines a sweep index according to a previously known rule based on the number of repetitions, a cell identifier, and an index of the code. In step 1312, the terminal detects a frame boundary using the sweep index, thus obtaining frame synchronization.

As described above, according to the present disclosure, when the terminal receives a BCH of a serving cell, inter-cell interference is naturally removed during, code de-covering and symbol combining, such that a stably low interference signal level can be maintained and thus BCH reception performance can be improved. Moreover, by applying codes of an (orthogonal) code set to sweep transmission in a frame differently according to a predetermined rule for BCH transmission, the terminal can detect a frame boundary without including a sweep index (or a BCH ID) in the BCH. Therefore, the base station can generate identical BCH contents to be transmitted in different directions in one frame, thus reducing the complexity of BCH transmission, and the terminal combines and receives BCH signals transmitted in different directions, thus improving, reception performance.

Although the present disclosure has been described via certain embodiments, various changes and modifications may be suggested to one skilled in the art. It is intended that the present disclosure encompass such changes and modifications as fall within the scope of the appended claims.

What is claimed is:

1. A method for transmitting a signal of a Broadcast Channel (BCH) in a cellular communication system, the method comprising:
    repeating, by a transmitter, symbols comprising information about the BCH;
    masking, by the transmitter, the repeated symbols with at least one code selected from a given code set based on a number of repetitions of the symbols and a beam index indicating a beam for transmission of the BCH;
    subcarrier-mapping, by the transmitter, the masked symbols; and
    transmitting, by the transmitter, the subcarrier-mapped symbols by using the beam corresponding to the selected at least one code.

2. The method of claim 1, wherein the at least one code is selected from the given code set according to a predefined rule based on a cell identifier of a cell in which the BCH is transmitted and the beam index used in transmission of the BCH.

3. The method of claim 1, wherein the subcarrier-mapped symbols are transmitted in a plurality of regions that are separated at equal intervals in a frame by using different beams for the plurality of regions.

4. The method of claim 1, wherein the subcarrier-mapped symbols are transmitted in a plurality of consecutive regions of a forepart of a frame by using different beams for the plurality of consecutive regions.

5. The method of claim 1, wherein the at least one code is selected by a code index calculated using:

Code $c=(\text{IDcell}+w) \bmod R$, wherein c indicates the code index, IDcell indicates a cell index of a cell in which the BCH is transmitted, w indicates a beam index used for the BCH, and R indicates a number of repetitions of the symbols.

6. The method of claim 1, wherein the given code set comprises a plurality of Walsh Hadamard codes.

7. The method of claim 1, wherein a number of repetitions of the symbols is determined by one or more of a structure of a base station that transmits the BCH and a total number of antenna devices available for the BCH.

8. The method of claim 1, wherein a number of repetitions of the symbols is determined by a number of transmission beams available for the BCH.

9. The method of claim 1, wherein the subcarrier-mapping of the masked symbols comprises mapping symbols corresponding to repetitions of one symbol to adjacent frequency tones or time symbols.

10. A method for receiving a signal of a Broadcast Channel (BCH) in a cellular communication system, the method comprising:
    configuring, by a receiver, a reception vector comprising a predetermined number of symbols that comprise information about the BCH based on a reception signal received from a transmitter;
    detecting, by the receiver, at least one code of a given code set, which is applied to masking of the symbols, from the reception vector;
    detecting, by the receiver, a beam index indicating a beam used for transmission of the BCH, based on a code index of the at least one detected code; and
    determining, by the receiver, a boundary of a frame used in communication between the transmitter and the receiver, based on the beam index.

11. The method of claim 10, wherein the beam index is detected based on the code index, a number of repeated symbols that form the reception vector, and a cell identifier of a cell in which the BCH is transmitted.

12. The method of claim 10, wherein the reception vector is transmitted in a plurality of regions that are separated at equal intervals in the frame by using different beams for the plurality of regions.

13. The method of claim 10, wherein the reception vector is transmitted in a plurality of consecutive regions of a forepart of the frame by using different beams for the plurality of consecutive regions.

14. The method of claim 10, wherein the beam index is calculated using:

Code $c=(\text{IDcell}+w) \bmod R$, wherein c indicates the code index, IDcell indicates a cell index of a cell in which the BCH is transmitted, w indicates a beam index used for the BCH, and R indicates a number of repeated symbols of the reception vector.

15. The method of claim 10, wherein the given code set comprises a plurality of Walsh Hadamard codes.

16. The method of claim 10, wherein a number of repeated symbols of the reception vector is determined by one or more of a structure of a base station that transmits the BCH and a total number of antenna devices available for the BCH.

17. The method of claim 10, wherein a number of repeated symbols of the reception vector is determined by a number of transmission beams available for the BCH in a base station that transmits the BCH.

18. The method of claim 10, wherein a number of the repeated symbols of the reception vector is obtained from a Synchronization Channel (SCH) transmitted from a base station.

19. An apparatus for transmitting a Broadcast Channel (BCH) in a cellular communication system, the apparatus comprising:
    a memory element; and
    a controller coupled to the memory element, the controller configured to control:
        repeat symbols comprising information about the BCH;
        mask the repeated symbols with at least one code selected from a given code set based on a number of repetitions of the symbols and a beam index indicating a beam for transmission of the BCH;
        subcarrier-map the masked symbols; and
    a transmitter configured to transmit the subcarrier-mapped symbols by using the beam corresponding to the at least one selected code.

20. The apparatus of claim 19, wherein the at least one code is selected from the given code set according to a predefined rule based on a cell identifier of a cell in which the BCH is transmitted and the beam index used in the BCH.

21. The apparatus of claim 19, wherein the subcarrier-mapped symbols are transmitted in a plurality of regions that are separated at equal intervals in a frame by using different beams for the plurality of regions.

22. The apparatus of claim 19, wherein the subcarrier-mapped symbols are transmitted in a plurality of consecutive regions of a forepart of a frame by using different beams for the plurality of consecutive regions.

23. The apparatus of claim 19, wherein the at least one code is selected by a code index calculated using:

Code $c=(\text{IDcell}+w) \bmod R$, wherein c indicates the code index, IDcell indicates a cell index of a cell in which the BCH is transmitted, w indicates a beam index used for the BCH, and R indicates a number of repetitions of the symbols.

24. The apparatus of claim 19, wherein the given code set comprises a plurality of Walsh Hadamard codes.

25. The apparatus of claim 19, wherein a number of repetitions of the symbols is determined by one or more of a structure of a base station that transmits the BCH and a total number of antenna devices available for the BCH.

26. The apparatus of claim 19, wherein a number of repetitions of the symbols is determined by a number of transmission beams available for the BCH.

27. The apparatus of claim 19, wherein the subcarrier-mapper maps symbols corresponding to repetitions of one symbol to adjacent frequency tones or time symbols.

28. An apparatus for receiving a Broadcast Channel (BCH) in a cellular communication system, the apparatus comprising:
    a memory element;
    a receiver configured to receive a reception signal from a transmitter; and
    a controller coupled to the memory element and the receiver, the controller configured to:

configured a reception vector comprising a predetermined number of symbols that comprise information about the BCH based on the reception signal, detect at least one code of a given code set, which are applied to masking of the symbols, from the reception vector, detect a beam index indicating a beam used for transmission of the BCH, based on a code index of the at least one detected code, and determine a boundary of a frame used in communication between the transmitter and the receiver, based on the beam index.

29. The apparatus of claim 28, wherein the beam index is detected based on the code index, a number of repeated symbols that form the reception vector, and a cell identifier of a cell in which the BCH is transmitted.

30. The apparatus of claim 28, wherein the reception vector is transmitted in a plurality of regions that are separated at equal intervals in the frame by using different beams for the plurality of regions.

31. The apparatus of claim 28, wherein the reception vector is transmitted in a plurality of consecutive regions of a forepart of the frame by using different beams for the plurality of consecutive regions.

32. The apparatus of claim 28, wherein the beam index is calculated using:

$$\text{Code } c = (\text{IDcell} + w) \bmod R,$$

wherein c indicates the code index, IDcell indicates a cell index of a cell in which the BCH is transmitted, w indicates a beam index used for the BCH, and R indicates a number of repeated symbols of the reception vector.

33. The apparatus of claim 28, wherein the given code set comprises a plurality of Walsh Hadamard codes.

34. The apparatus of claim 28, wherein a number of repeated symbols of the reception vector is determined by one or more of a structure of a base station that transmits the BCH and a total number of antenna devices available for the BCH.

35. The apparatus of claim 28, wherein a number of repeated symbols of the reception vector is determined by a number of transmission beams available for the BCH in a base station that transmits the BCH.

36. The apparatus of claim 28, wherein a number of repeated symbols of the reception vector is obtained from a Synchronization Channel (SCH) transmitted from a base station.

* * * * *